US007613089B2

(12) United States Patent
Lee et al.

(10) Patent No.: US 7,613,089 B2
(45) Date of Patent: Nov. 3, 2009

(54) MONITOR AND ADJUST METHOD FOR OPTICAL DISC RECORDING

(75) Inventors: Keug-Len Lee, Taipei (TW); Sherlack Chu, Taipei (TW)

(73) Assignee: Via Technologies, Inc., Taipei (TW)

( * ) Notice: Subject to any disclaimer, the term of this patent is extended or adjusted under 35 U.S.C. 154(b) by 621 days.

(21) Appl. No.: 11/329,288

(22) Filed: Jan. 11, 2006

(65) Prior Publication Data
US 2006/0153027 A1 Jul. 13, 2006

Related U.S. Application Data

(60) Provisional application No. 60/642,529, filed on Jan. 11, 2005.

(51) Int. Cl.
*G11B 7/125* (2006.01)
(52) U.S. Cl. .................................. 369/47.53; 369/53.26
(58) Field of Classification Search ............. 369/47.53, 369/47.51, 47.5, 53.26
See application file for complete search history.

(56) References Cited

U.S. PATENT DOCUMENTS

| | | | | |
|---|---|---|---|---|
| 6,269,062 | B1 * | 7/2001 | Minemura et al. ....... | 369/47.53 |
| 2001/0007546 | A1 * | 7/2001 | Lee et al. ................. | 369/47.53 |
| 2002/0064109 | A1 * | 5/2002 | Shimoda et al. .......... | 369/47.53 |
| 2002/0085462 | A1 * | 7/2002 | Spruit ...................... | 369/47.53 |
| 2003/0007435 | A1 * | 1/2003 | Fukumoto ................ | 369/47.53 |
| 2003/0035355 | A1 * | 2/2003 | Morishima ............... | 369/47.53 |
| 2003/0043714 | A1 * | 3/2003 | Takeda .................... | 369/47.53 |
| 2004/0076094 | A1 * | 4/2004 | Toshiaki et al. .......... | 369/47.53 |
| 2004/0120234 | A1 * | 6/2004 | Sano ........................ | 369/47.53 |
| 2005/0018562 | A1 * | 1/2005 | Hsiao ....................... | 369/47.5 |
| 2005/0105418 | A1 * | 5/2005 | Kuwahara et al. .......... | 369/47.5 |

* cited by examiner

*Primary Examiner*—Wayne R Young
*Assistant Examiner*—Thomas D Alunkal
(74) *Attorney, Agent, or Firm*—Thomas, Kayden, Horstemeyer & Risley

(57) ABSTRACT

A method is disclosed for adjusting write power when recording an optical disc. First, pre-setting a range of a write quality parameter and a write power. Next, moving a spindle motor and an optical pickup head to a target track. After the spindle motor is stable at the intended rotation speed as well as the optical pickup head is positioned correctly at the target track, then reading a write quality parameter. Then, determining whether the write quality parameter is in the range. When the write quality parameter is in the range, then according to the write power to write data to the target track. When the write quality parameter is out of the range, then adjusting the write power to write data to the target track.

6 Claims, 2 Drawing Sheets

MONITOR AND ADJUST METHOD FOR OPTICAL DISC RECORDING

CROSS REFERENCE TO RELATED APPLICATIONS

This application claims the benefit of U.S. Provisional Application No. 60/642,529, filed on Jan. 11, 2005, which is herein incorporated by reference for all intents and purposes.

BACKGROUND OF THE INVENTION

1. Field of the Invention

The present invention generally relates to optical disc recording, and more particularly to method for adjusting write power when recording optical disc.

2. Description of the Prior Art

Optical disc recorders, such as CD-R and DVD-R, are very popular in current information technology applications. In the recording process, or so-called burning process, one optical pickup head of the recorder emits a laser beam projecting at a plurality of tracks on the surface of optical disc for recording data. The power of the emitted laser beam is referred as a write power. When the write power is too high or too low, the recording quality of the optical disc is downgraded. Usually, conventional recorders read some parameters indicating the recording quality (referred as write quality parameters), such as Beta value, and setup a proper write power prior to perform recording process. During the whole record period, a plurality of tracks are recorded using this write power for several dozens of seconds.

However, when a record task lasts for a long period, the temperature of optical disc is raised up. In ideal, the write power should be decreased in order to keep the temperature of optical disc in a proper range. But the write power only is setup before the record process, not adjusted during the record task by the conventional recorder. In other words, the write quality of the later part of the record task may be downgraded due to the heating temperature of the optical disc.

Accordingly, there exists a need of a method for adjusting write power when recording optical disc in order to maintain good write quality in the whole recording duration.

SUMMARY OF THE INVENTION

A method is disclosed for adjusting write power when recording optical disc. First, pre-setting a range of a write quality parameter and a write power. Next, moving a spindle motor and an optical pickup head to a target track. After the spindle motor is stable at the intended rotation speed as well as the optical pickup head is positioned correctly at the target track, then reading a write quality parameter. Then, determining whether the write quality parameter is in the range. When the write quality parameter is in the range, then according to the write power to write data to the target track. When the write quality parameter is out of the range, then adjusting the write power to write data to the target track.

Another method is disclosed for adjusting write power when recording optical disc. First, pre-setting a range of a write quality parameter and a write power. Next, moving a spindle motor and an optical pickup head to a target track. After the spindle motor is stable at the intended rotation speed as well as the optical pickup head is positioned correctly at the target track, then reading a write quality parameter. Following, storing and accumulating the write quality parameter in a memory unit and counting a number of times of storing write quality parameters. After that, determining whether the number of times of storing write quality parameters is equaled to a target value. And at last, writing a data to the target track according to the write power when the number of times of storing write quality parameters is less than the target value.

In one embodiment of the present invention, when the number of times of storing write quality parameters is equaled to the target value, then calculating an average write quality parameter of accumulated value of the write quality parameters in the memory unit, and resetting the number of times of storing write quality parameters and the accumulated value of the write quality parameters. Therefore, when the average write quality parameter is in the range, then writing a data to the target track according to the write power, which is un-adjusted; when the average write quality parameter is out of the range, then writing the data to the target track according to the adjusting write power.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
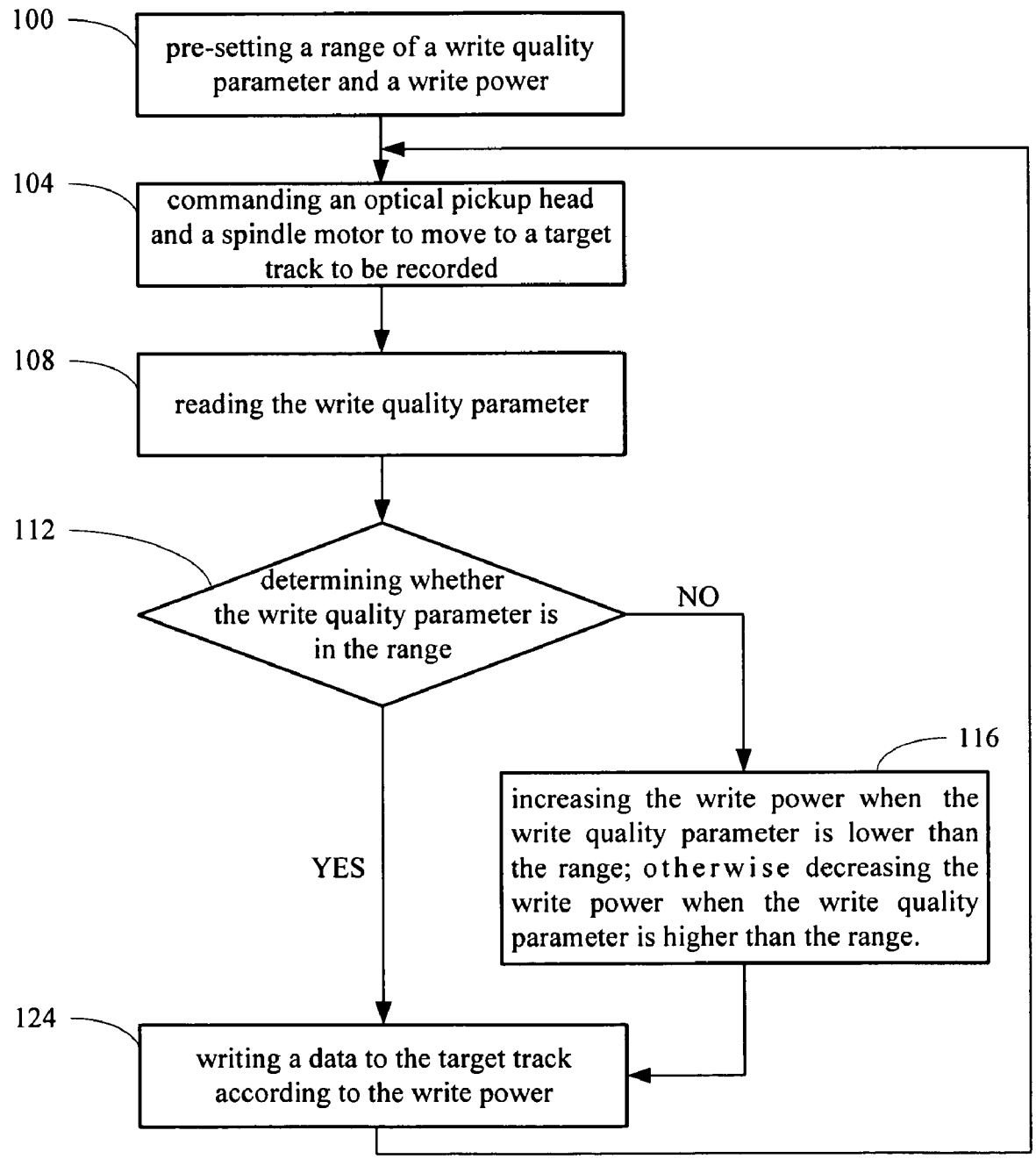
FIG. 1 is a diagram illustrating a flowchart of reading a write quality parameter and adjusting write power for recording optical disc in accordance with an embodiment of the present invention.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

In a burning task, it can be in constant rotation speed mode or in constant track speed mode. In constant rotation speed mode, no matter in inner tracks or in outer tracks, the rotation speed of optical disc is kept constantly. It implies that the rotation speed of a spindle motor is not changed. In the contrary, in constant track speed mode, the rotation speed of the spindle motor is adjusted by the circumference of working track. Between tracks, it requires more seeking time in constant track speed mode than in constant rotation speed mode. Hence, it is possible to read some write quality parameters during these track seeking times in a burning task in constant rotation track speed mode. Nonetheless, the present invention can be applied to both modes.

Please refer to FIG. 1, which illustrates a flowchart of reading a write quality parameter and adjusting write power for recording optical disc in accordance with an embodiment of the present invention. In this regards, the kinds of optical disc referred in this present invention includes DVD−R, DVR+R, DVD−RW, DVD+RW, CD−R, CD+RW, and any other optical recording media. All kinds of applicable optical media cannot be enumerated in the present invention, but any professional persons in this skill could understand what all applicable optical media means. At first, an optical disc recorder is provided. The optical disc recorder further includes an optical pickup head moving on a plurality of tracks of an optical disc.

In the first step 100 of the FIG. 1, a range of a write quality parameter is pre-set for a recording task. The write quality parameter includes Beta value, Gamma value, jitter value, or any other parameters related to the write quality. Furthermore, the first step 100 includes pre-setting a write power. Next, proceeding step 104, the spindle motor and optical pickup head are commanded to move to a target track to be recorded. After the spindle motor is stable at the intended rotation speed as well as the optical pickup head is positioned correctly at the target track, the current write quality parameter, such as Beta value, could be read in the next step 108.

Following, in the step 112, to determine whether the current write quality parameter is in the range. When the write quality parameter is not situated in the range, the flow goes to the step 116. In the step 116, when the write quality parameter is lower than the range, then increasing the write power; otherwise, decreasing the write power when the write quality parameter is higher than the range. When the write quality parameter is in the range, there is no need to adjust the write power. Next, processing the step 124, writing a data to the target track according to the write power described above. If there is any un-recorded track remained in this record task, the flow returns to the step 104 and repeats the steps 108 to 124. More specified, the adjustment degree is dependent on the gap between the write quality parameter and the pre-set range, the detailed would be described in the following examples.

In an embodiment of the present invention, in the beginning step 100, a range of a write quality parameter is pre-set before the record task starts. In this embodiment, the write quality parameter is a Beta value as well as the range is set between 2550 and 2650. The beginning step 100 further includes presetting a default write power as 10 mW. Next, proceeding step 104, the spindle motor and optical pickup head are commanded to move to a target track to be recorded. After the spindle motor is stable at the intended rotation speed as well as the optical pickup head is positioned correctly at the target track, the current write parameter, such as Beta value, could be read in the next step 108. Beta value, representing the temperature of optical disc recording, would be changed according to the duration of the record period. Generally speaking, when the read Beta value is higher, the temperature of optical disc recording is analogously higher; when the read Beta value is lower, the temperature of optical disc recording is analogously lower.

Following, in the step 112, to determine whether the Beta value is in the range. Taking advantage of the Beta value characteristics, when the read Beta value is 2500, which is out of the range between 2550 and 2650, the flow goes to step 116. Since the read Beta value, 2500, which is lower than the range, 2550~2650, it is indicated that the temperature of the optical disc recording is lower than expected, the current write power is adjusted to 10.2 mW due to an extra 0.2 mW which is proportional to the gap between the read Beta value, 2500, and the range, 2550~2650. In the contrary, when the Beta value, read as 2700, which is higher than the range, 2550~2650, it is indicated that the temperature of the optical disc recording is higher than expected. Therefore the current write power is adjusted to 9.8 mW due to a decrease of 0.2 mW which is also proportional to the gap between the read Beta value, 2700, and the range, 2550~2650. Moreover, when the read Beta value, for example 2600, is in the range, 2550~2650, there is no need to adjust the write power, which is remained as 10 mW. The degree of adjustment depends on engineering considerations which any professional persons in this skill could understand. Later, processing the step 124, writing data at the target track according to the write power, for example, 10 mW, 10.2 mW, or 9.8 mW. If there is any un-recorded track remained in this record task, the flow returns to the step 104 and repeats the iteration of the steps 108 to 124.

Figure 2:
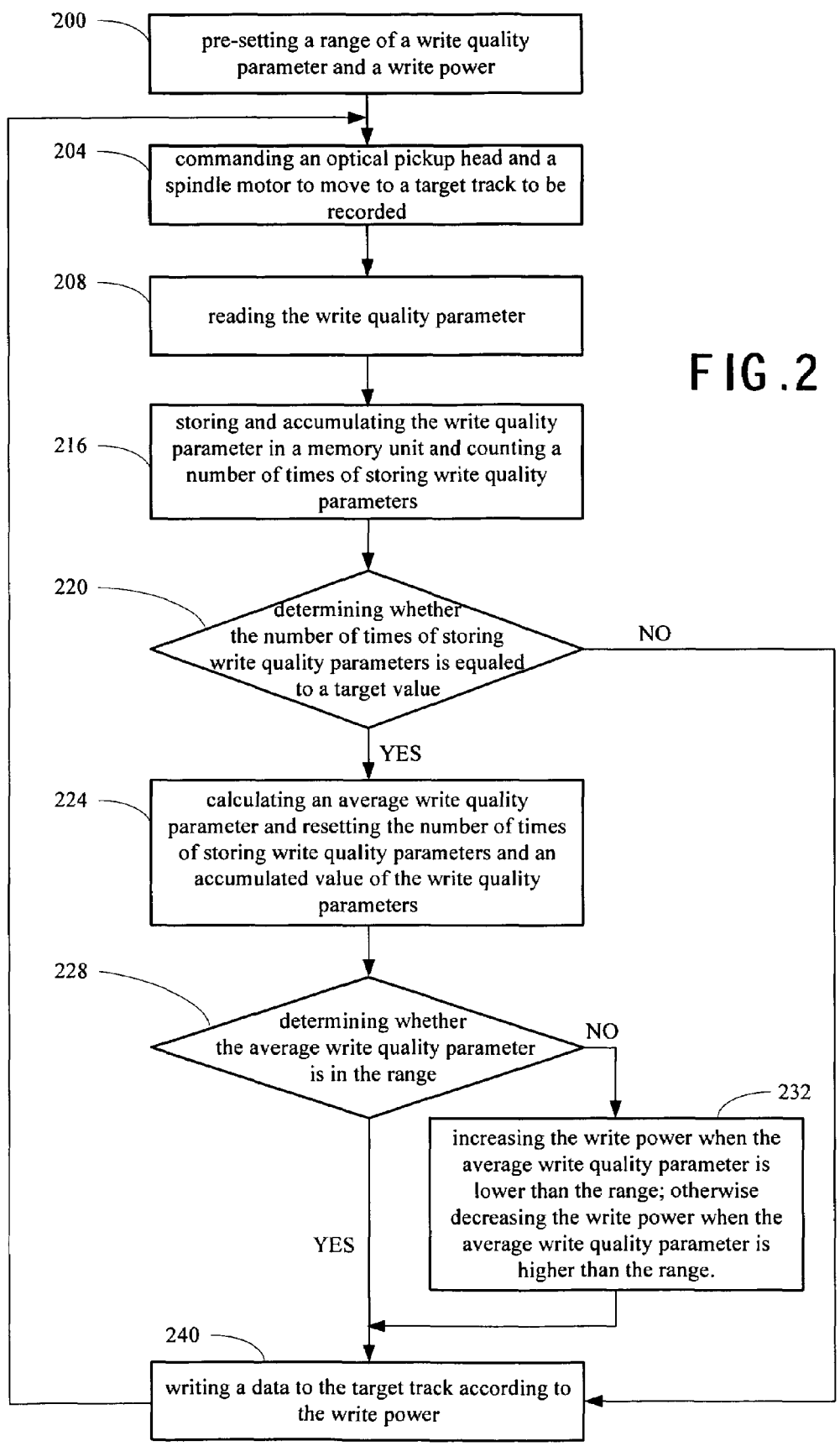
FIG. 2 is a diagram illustrating another flowchart of reading a write quality parameter and adjusting write power for recording optical disc in accordance with another embodiment of the present invention.

Please refer to FIG. 2, which illustrates another flowchart of reading a write quality parameter and adjusting write power for recording optical disc in accordance with another embodiment of the present invention. At first, an optical disc recorder is provided. The optical disc recorder further includes an optical pickup head moving on a plurality of tracks of an optical disc. Similar with the embodiment shown in the FIG. 1, in step 200, a range of a write quality parameter is pre-set for a recording task. The write quality parameter includes Beta value, Gamma value, jitter value, or any other parameters related to the write quality. Furthermore, the step 200 includes pre-setting a write power. Next, proceeding step 204, the spindle motor and optical pickup head are commanded to move to a target track to be recorded. After the spindle motor is stable at the intended rotation speed as well as the optical pickup head is positioned correctly at the target track, the current write parameter, such as Beta value, could be read in the next step 208.

Following, processing the step 216, the read write quality parameter is stored and accumulated in a memory unit, such as registers or buffers. The step 216 includes counting the number of times of storing write quality parameters in a counter, wherein the counter may be also stored in the memory unit. Next, determining that whether the counter value is equaled to a target value in the following step 220. If so, the flow goes to a step 224; otherwise, it goes to another step 240. In the step 224, an average write quality parameter is calculated from the accumulated write quality parameters stored in the memory unit. Wherein the average write quality parameter is calculated as the quotient of the accumulated write quality parameters value dividing by the target value. Furthermore, other statistical functions such as root mean square function, differential function, and etc could also be applied in the step 224 within the scope of the present invention. Moreover, in the step 224, it also includes resetting the number of times of storing write quality parameters stored in the counter and accumulated write quality parameter in the memory unit. Following, processing the step 228, to determine that whether the average write quality parameter is in the range. If not so, it goes to the step 232. In the step 232, when the average write quality parameter is lower than the range, then increasing the write power according to the average write quality parameter; otherwise, the write power is decreased according to the average write quality parameter when the average write quality parameter is higher than the range. And the write power remained unchanged when the average write quality parameter is in the range. Later, processing step 240, data is written to the target track according to the write power. If there is any tracks remained in this record task, the flow returns to the step 204 from the step 240, and repeats the iteration of step 208 to 240. The adjustment degree of the write power is proportional to the gap between the read write quality parameter and the range. A complete example would be described in detail below.

In another embodiment, a range of a write quality parameter is pre-set prior to the beginning of a record task in the first step 200. In this regards, the write quality parameter is a Beta value, and the range is between 2550 and 2650. Moreover, a default write power is also pre-set as 10 mW in this step 200. Next, proceeding step 204, the spindle motor and optical pickup head are commanded to move to a target track to be recorded. After the spindle motor is stable at the intended rotation speed as well as the optical pickup head is positioned correctly at the target track, the current write parameter, such as Beta value, could be read in the next step 208. Beta value, representing the temperature of optical disc recording, would be changed according to the duration of the record period. Generally speaking, when the read Beta value is higher, the temperature of optical disc recording is analogously higher; when the read Beta value is lower, the temperature of optical disc recording is analogously lower.

Following, processing the step 216, the read write quality parameter is stored and accumulated in a memory unit, such as registers or buffers. In one example, the write quality parameter is read as 2555. The step 216 includes counting the number of times of storing Beta value as 1 in a counter, in this example. Next, determining that whether the counter value is larger than a target value, such as 8, in the following step 220. Since the counter value now is 1, it goes to the step 240, data is written to the target track according to the default write power, 10 mW. When there are other tracks in this record task, the flow returns to the step 204 from step 240, and repeats the iterations of step 208 to 240 again and again until the counter value is reached to 7. The Beta values read in these six iterations are 2562, 2582, 2590, 2605, 2615, and 2632. However, the counter value, 7, is not equal to the target value, 8. Therefore, data is written to target tracks according to the default write power 10 mW so far. In addition, a sum of these Beta values in the memory unit is accumulated as 18141. After that, the flow returns to step 204 and repeats the iteration of step 208 to 240. A new Beta value, 2660, is read in this iteration and the counter value is accumulated to the target value, 8. Next, processing step 224, an average Beta value of the accumulated Beta values is calculated as the quotient of the accumulated Beta values dividing by the target value, 8. Hence, the average Beta value is approximated to 2600. ([2555+2562+2582+2590+2605+2615+2632+2660]/8=20801/8) Moreover, in the step 224, it also includes resetting the number of times of storing Beta values stored in the counter and accumulated Beta value in the memory unit. In the next step 228, determining whether the average Beta value is in the range of 2550 and 2650. The average Beta value 2600 is determined in the range of 2550 and 2650, then the write power is remained as 10 mW. Next, the step 240 would be processed, data is written to the target track according to the write power, 10 mW.

If the average Beta value is 2500, which is out of the range of 2550 and 2650. It represents the temperature of optical disc recording is too low, therefore the step 232 would be processed. In the step 232, the write power is increased 0.2 mW to 10.2 mW according to the gap between the average Beta value, 2500, and the range, 2550 to 2650. In the contrary, if the average Beta value is read as 2700, higher than the range of 2550 and 2650, it represents the temperature of optical disc recording is too high. Therefore the write power is reduced 0.2 mW to 9.8 mW according to the gap between the average Beta value, 2700, and the range, 2550 to 2650. Professionals in this skill could understand that the adjustment should be determined by physical engineering considerations. Later, processing step 240, data is written to the target track according to the write power. If there is any tracks remained in this record task, the flow returns to the step 204 from the step 240, and repeats the iteration of step 208 to 240.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method for adjusting write power of optical disc recording, comprising:

pre-setting a range of a write quality parameter and a write power;

commanding an optical pickup head and a spindle motor to move to a target track to be written;

reading said write quality parameter;

storing and accumulating said write quality parameter in a memory unit and counting a number of times of storing write quality parameters;

determining whether said number of times of storing write quality parameters is equaled to a target value;

writing a data to said target track according to said write power when said number of times of storing write quality parameters is less than said target value;

calculating an average write quality parameter and resetting said number of times of storing write quality parameters and an accumulated value of said write quality parameters when said number of times of storing write quality parameters is equaled to said target value;

determining whether said write quality parameter is in said range; and writing a data to said target track according to said write power, which is unadjusted, when said average write quality parameter is in said range; otherwise writing said data to said target track according to said write power, which is adjusted, when said average write quality parameter is out of said range.

2. A method of claim 1, further comprising:

increasing said write power when said average write quality parameter is lower than said range; and decreasing said write power when said average write quality parameter is higher than said range.

3. A method of claim 1, wherein said average write quality parameter is calculated as a quotient of said accumulated value of said write quality parameters dividing by said target value.

4. A method of claim 1, wherein said write quality parameter comprising:
- Beta value;
- a Gamma value;
- a jitter value; and
- any other parameters relating to write quality.

5. A method of claim 1, wherein said memory unit comprising one of the following:
- a register; and
- a buffer.

6. A method of claim 1, wherein said number of times of storing write quality parameters is stored in said memory unit.

* * * * *

UNITED STATES PATENT AND TRADEMARK OFFICE
CERTIFICATE OF CORRECTION

PATENT NO. : 7,613,089 B2  Page 1 of 1
APPLICATION NO. : 11/329288
DATED : November 3, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Nineteenth Day of October, 2010

David J. Kappos
*Director of the United States Patent and Trademark Office*